Aug. 14, 1934.   B. F. W. HEYER   1,970,091
STORAGE BATTERY CONNECTER
Filed July 11, 1931   2 Sheets-Sheet 1
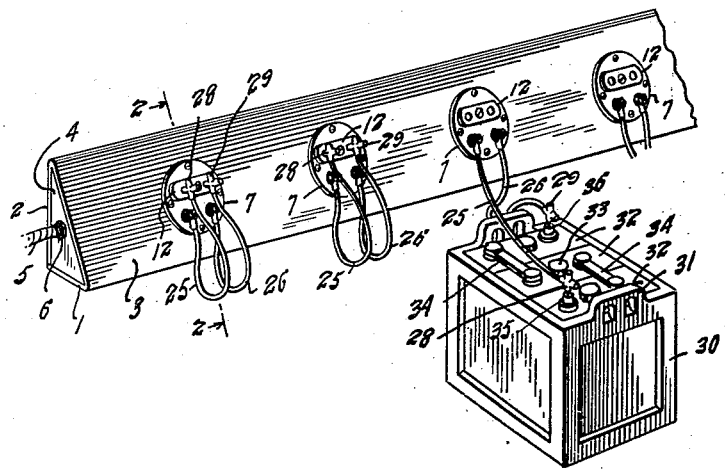
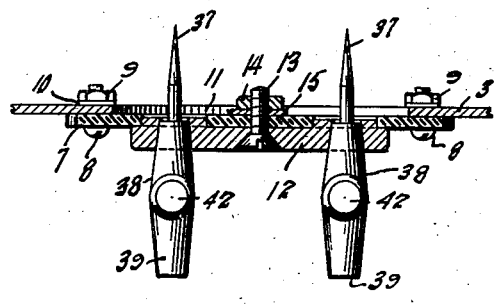
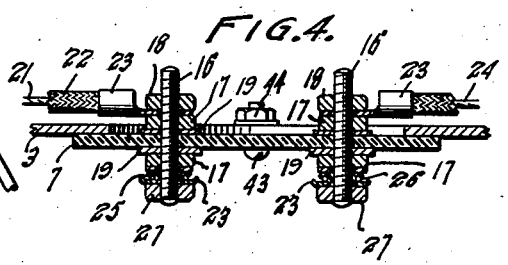
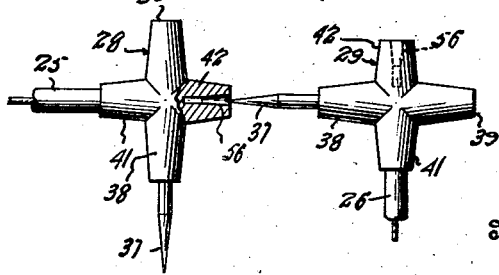
Inventor
BENJAMIN F. W. HEYER
By Semmes & Semmes
Attorney Aug. 14, 1934.                 B. F. W. HEYER                   1,970,091
                          STORAGE BATTERY CONNECTER
                            Filed July 11, 1931          2 Sheets-Sheet 2
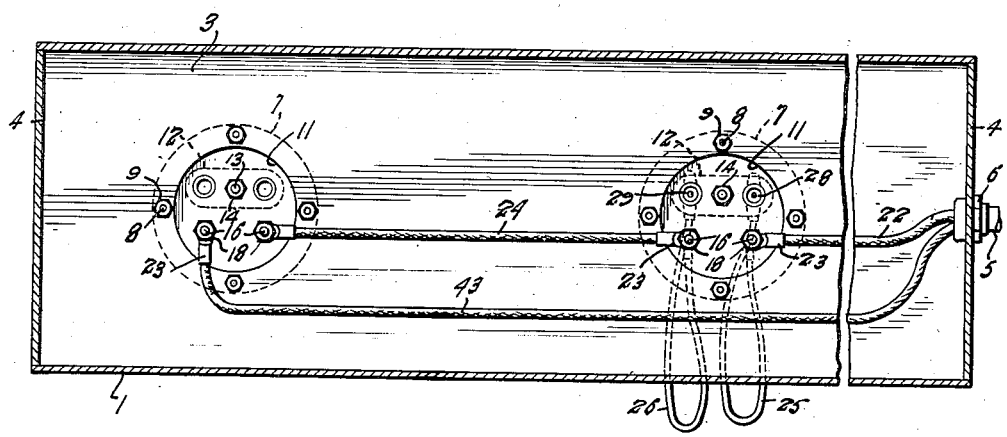
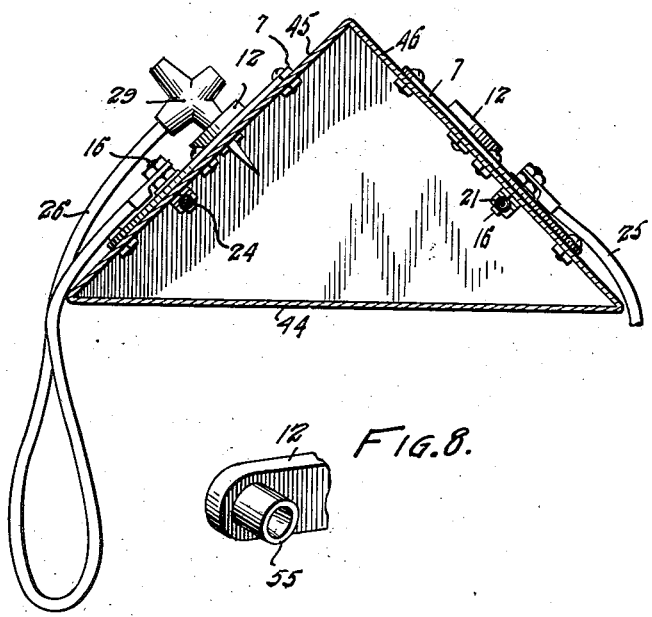
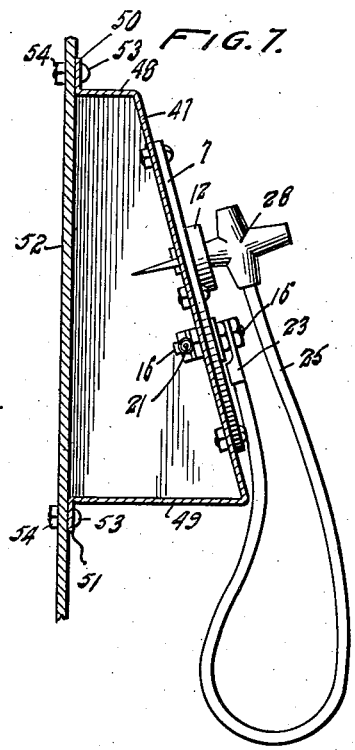
Inventor
BENJAMIN F. W. HEYER
By Semmes & Semmes
Attorneys Patented Aug. 14, 1934

1,970,091

UNITED STATES PATENT OFFICE 1,970,091

STORAGE BATTERY CONNECTER

Benjamin F. W. Heyer, Bloomfield, N. J.

Application July 11, 1931, Serial No. 550,209

15 Claims. (Cl. 136—181)

This invention relates in general to connecting devices, and more particularly has reference to connecters for charging storage batteries.

Previous to this time, in charging storage batteries it has been customary to join the opposite terminals of a plurality of batteries in series by connecters or jumpers, or between pairs of leads connected in series on a panel. In these latter types of connections switches have customarily been interposed between the pairs of leads for closing the circuit between one or more pairs of leads, with the removal of one or more batteries.

These prior types of connections have proved generally disadvantageous in practice, and it is the purpose of my invention to provide an arrangement of connections adapted to overcome the difficulties inherent in the former devices.

In the past, as already stated, connecters or pairs of leads capable of being connected by switches on a panel have been employed for connecting the opposite terminals of a plurality of storage batteries for charging. The connecters or jumpers heretofore used have consisted of short lengths of insulated conductors having either a terminal clamp or a pointed member for being driven into a battery terminal, connected at each end thereof. The likelihood of error which may result in the damage of one or more batteries by an inexperienced operator making such connections will be apparent. Further, it is a more or less painstaking operation for an experienced battery man to properly hook up a number of batteries with these connecters.

In the use of a multiplicity of pairs of leads connected in series on a panel, clamps have been provided on the free ends for engaging the battery terminals. These clamps have the disadvantage of becoming inoperative by reason of the spring elements therein decreasing in tension, and very often a poor contact is unknowingly made with the same because of the coating which collects on both the battery terminal and clamp by the corrosive action of battery acid fumes, and which may form a layer of insulating material. This disadvantage is, of course, overcome in the use of connecters including pointed members for driving into the terminals of batteries to penetrate such coatings and insure good connections.

When one or more batteries connected in either of the ways which have been described, and undergoing charging, are removed, it is necessary where connecters or jumpers are used, to connect the ends of the jumpers removed from the battery to close the series circuit so that charging of the remainder of the batteries may be continued. Similarly, where batteries are connected between pairs of leads arranged on a panel it is necessary to connect the ends of the leads removed to close the circuit. This has been done by closing the switches provided between each pair of leads. Switches are costly to provide, however, and complicate the operation of a charging rack. In instances where connecters are used, if one or more adjacent batteries are removed, the connecters are usually too short to bridge the resulting gap, and it is necessary to provide additional connections. If switches are not employed between the pairs of leads, it is essential to connect the leads in each pair by connection of the clamps on the ends thereof. Such connections are very often poor and accordingly affect the charging of the batteries for the same reason pointed out with reference to the use of clamps on battery terminals.

In the use of either connecters or pairs of leads for hooking up batteries for charging, the arrangement used up to this time, including either connecters or leads, has been of a character wherein the same have been liable to inadvertently contact and thus cause short circuiting which may damage one or more of the batteries undergoing charging.

An object of this invention is to provide a pair of leads for connection to the opposite terminals of a storage battery attached to a unit adapted to be interposed in a series circuit, the unit having provision for receiving the connecters on the leads for closing a circuit when not connected to the terminals of a battery.

Another object of this invention is to provide a pair of leads for connection to the terminal of a storage battery connected to a unit adapted to be interposed in a series circuit having a multiplicity of similar units interposed therein, each unit having provision for receiving connecters attached to the ends of the leads when the same are not connected to the terminal of a storage battery to close the circuit.

A further object of this invention is to provide a panel having a plurality of units connected in series thereon, each unit having a pair of leads attached thereto for connection to the opposite terminals of a storage battery, or to a conductor in each unit, for closing the circuit.

A still further object of this invention is to provide a panel capable of wide variation in construction adapted to have a plurality of units connected in series thereon, having leads for connection to the opposite terminals of storage batteries or to a conductor provided on each unit for closing the circuit, the panel being formed to close the connections of the units to prevent corrosion thereof by battery acid fumes.

A still further object of this invention is to provide a pair of terminal connecters capable of being connected together.

With these and other objects in view, which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claims.

In order to make my invention more clearly understood, I have shown in the accompanying drawings, means for carrying the same into practical effect without limiting the improvements in their useful applications to the particular constructions which, for the purpose of explanation, have been made the subject of illustration.

In the drawings:

Figure 1 is a perspective fragmentary view of one end of my panel having a plurality of units connected in series thereon, each provided with pairs of conductors for connection to the opposite terminals of a storage battery, the leads on one unit being shown connected to the terminals of a storage battery, and the pairs of leads on the other units being shown connected to a conductor included on each unit for closing the circuit when the connecters are not in contact with battery terminals;

Figure 2 is an end sectional view of the panel shown in Figure 1, showing one unit from the side;

Figure 3 is a sectional view taken on line 3—3 of Figure 2;

Figure 4 is a sectional view taken on line 4—4 of Figure 2;

Figure 5 is a sectional view taken on line 5—5 of Figure 2;

Figure 6 is an end sectional view of a modified form of panel for mounting units on each side thereof;

Figure 7 is an end sectional view of another modified form of panel for mounting against a vertical surface;

Figure 8 is a perspective view of a modified form of conductor for receiving clamps on a unit in place of the types of connecters shown.

Figure 9 is a side view of two modified forms of connecters shown connected.

Referring by numerals to the drawings, and more especially to Figure 1, there is shown a panel comprising a bottom portion 1, back portion 2, front portion 3 and end portions 4 adapted to be mounted on any suitable rack for charging storage batteries. The panel is composed of any suitable material, preferably of sheet metal coated with baked enamel.

A pair of conductors carrying rectified current are adapted to be introduced in the interior of the panel, such as through a cable 5 extending through an aperture provided in one end 4, and locked in place by a nut 6. The conductors are connected in series to a plurality of units connected on the front or face 3 of the panel. These units, as is best shown in Figures 2, 3 and 4, comprise disks of insulated material 7 fixed on the face of the panel through any suitable fastening means, such as by bolts 8 and nuts 9, the bolts extending through registering apertures provided in the disks and the panel, and the bolts being held in a fixed position by washers 10, in the conventional manner. The disks are preferably round in configuration, although manifestly the same may be of any other desired shape, and are adapted to fit over apertures 11 formed in the panel. Blocks of conductor material 12 are fixed on the upper portions of the disks by a screw-headed bolt 13 extending through registering apertures provided in the conductor blocks and disks, and fixed in place by nuts 14 and washers 15. The heads of the bolts are fitted in a tapered seat provided in the conductor block so that the heads thereof fit flush with the faces of the blocks.

The lower portion of each disk 7 is provided with horizontally aligned apertures for receiving terminal members 16, as shown in Figure 4. These terminal members are fixed in place by nuts 17 and screwed thereon on each side of the disk, having washers 19 interposed between the respective back and front faces of the disks.

The inner ends of the terminal members are adapted to extend through the apertures provided in the face piece 3 of the panel in the rear of each disk. A conductor 21 having insulation 22 and a terminal contact 23 fixed on the end thereof, is connected to the inner end of one terminal member 16 and screwed against the face of the nut 17 by a nut 18 also screwed on the terminal member. An insulated conductor 24 for connection to the terminal member of another unit in series is similarly fixed on the inner end of the other terminal member 16 through a terminal contact 23.

A pair of leads 25 and 26 are connected at one end to the outer ends of the terminal member 16, the leads being provided with terminal contacts and fixed on the terminal members 16 by nuts 27. Pointed connecters 28 and 29 are attached to the free ends of the leads 25 and 26, for connection thereof to the opposite terminals of a storage battery, as illustrated in Figure 1, wherein a battery comprising the conventional casing 30 provided with handles 31, for receiving cells 32 having closure caps 33, connecters 34 and terminals 35 and 36, is shown.

The connecters 28 and 29 are of the character described in the Sutherland Patent No. 1,747,268, issued February 18, 1930, for Connecter for terminals, or they may be constructed in accordance with any of the connecters shown in my co-pending application Serial No. 550,208 filed July 11, 1931 for Battery terminal connecter.

These connecters comprise pointed members 37 as shown in Figure 3, for being driven or otherwise fitted in the opposite terminals 35 and 36 of a storage battery, such as is shown in Figure 1. The connecters 28 and 29 further comprise tapered body portions 38 adapted to fit in horizontally aligned apertures provided in the conductor blocks 12 fixed on the disks 7 in each unit on the panel when the connecters are not in engagement with the terminals of the battery, so as to close the circuit.

For facilitating the manipulation of the connecters in the insertion and removal of the same from either a battery terminal or the apertures in the conductors 12, the same are preferably formed with a pounding head 39 and arms 41. One of the arms 41 is formed as a sleeve for receiving the end of a lead, the conductor of which is suitably connected to the pointed members 37 within the tapered portions 38 of the connecters.

It will of course be appreciated that my invention is in nowise limited to the connection of the units on panels as shown, the same being capable of being mounted in any other suitable manner. Further, for the apertured conductor blocks 12, any other type of receiving means, integrally formed, or otherwise, may be substituted therefor.

The assembly of my unit will be apparent. The conductor blocks 12 are fixed on the insulator pieces 7 by the screw-headed bolt 13, the washer 15 placed thereon and the nut 14 screwed on the end. The threaded terminal members 16 are inserted in the horizontally aligned apertures provided in the insulator disks, and fixed therein by the nuts 17 screwed thereon and having the washers 19 interposed therebetween on each side of the disks.

The pair of leads 25 and 26 having the connecters 28 and 29 fixed on the ends thereof for insertion in the opposite terminals of a storage battery are connected at the other ends to the terminal pieces 16, having terminal contacts 23 fixed on the ends thereof for engaging the terminal pieces, secured thereon by nuts 27.

Each of the units having a pair of leads with connecters attached to the ends thereof for selectively fitting in the opposite terminals of a storage battery or in the apertures provided in the conductor blocks 12, are adapted to be mounted on a suitable panel, such as the panel shown in Figure 1.

The panel comprises a bottom portion 1, back portion 2, front portion 3 and end portions 4. The insulating disks 7 in each unit are mounted over apertures provided in the front piece or face of the panel 3 and secured thereon by bolts 8 and nuts 9, as shown in Figure 2, the bolts extending through registering apertures provided in the disks adjacent the rims thereof, and in the front piece 3 of the panel adjacent the edges of the apertures therein.

The conductors 21 and 24 having terminal caps 23 fixed on the ends thereof are adapted to be connected to the terminal pieces 16 by nuts 18, as has already been described in Figure 4.

In Figure 5 is shown the rear of the face piece 3 of the panel with a plurality of units attached thereto. The insulated conductor 22 is shown introduced through the cable 5 in the aperture provided in the end 4, having a terminal contact 23 fixed on the end thereof and connected to the terminal piece 16. The conductor 24 having terminal contacts 23 on each end is connected to the opposite terminal piece 16 on another unit, the other terminal piece of which is connected by a return lead 43 closing the circuit with the charging current.

It will be seen from the foregoing that the terminal pieces 16 are adapted to be connected in series in a charging circuit, and the leads 25 and 26 connected to the terminal pieces at one end and to the opposite terminals of a battery by the connecters 28 and 29 at the other end, to close the circuit through a storage battery. When the connecters 28 and 29 in a unit are not in engagement with the terminals of a battery, the tapered portions 39 and 40 thereon are adapted to be inserted in the apertures provided in the conductor blocks 12 on each unit to similarly close the circuit so that the charging of other batteries connected between the leads in the other units, will not be interrupted. The stationary fixing of the conductors 28 and 29 in the apertures provided in the block 12 when not in engagement with the terminals of a battery, besides providing for closing the circuit so as not to interrupt the charging of other batteries interposed therein, provides for the secure fixing of the ends of the leads so as to insure against short circuiting thereof by inadvertent contact with extraneous electrical conductors.

The tapered body portions 38 on the connecters, as well as the conductor blocks 12, are adapted to be composed of a soft metal, preferably one not subject to corrosion by battery acid fumes, such as lead. The character of such a metal coupled with the conformation of the portion of the connecters adapted to fit therein provides for a firm seat and establishment of a good connection therebetween.

It will be appreciated that the mounting of my units is in nowise restricted to the particular type of panel shown. For example, in Figure 6 is shown a panel having a bottom portion 44 and side portions 45 and 46, adapted to provide for the mounting of units on each side so that batteries may be charged on each side thereof.

In Figure 7 is shown another form of panel comprising a face portion 47 and top and bottom portions 48 and 49 formed with flanges 50 and 51 for fitting against a wall, such as is fragmentarily illustrated at 52, by bolts 53 and nuts 54, the bolts 57 extending through registering apertures provided in the flanges 50 and 51, in the wall.

Both of the types of panels shown in Figures 6 and 7 are adapted to be provided with end closures in the same manner as the panel shown in Figure 1, so as to enclose the connections between the units to prevent the corrosion thereof by battery acid fumes.

In Figure 8 is shown a modified form of conductor block 12 for fitting on a unit, provided with projections 55 substituted for the aligned apertures provided in connection with the preferred form of my invention. The projections 55 are provided for receiving clamps, if clamps are employed, for connecting the leads to battery terminals in place of the types of connecters described.

In Figure 9 two connecters are shown, having the arms 28 and 29 formed with apertures 56 for selectively receiving the pointed members 37 on each connecter. Manifestly, the connecters may be provided with any other suitable type of connecting means, where it is desired to dispense with the conductor blocks 12 or other connecting member employed.

There is accomplished by this invention a unit for connecting leads for engaging battery terminals, in a series circuit, providing for receiving the leads for closing the circuit when the same are not in engagement with terminals of a battery, and a panel for mounting a plurality of the units constructed to provide for enclosing the connections between the units to prevent corrosion thereof by battery acid fumes, and of a character susceptible to variation for mounting on different types of charging racks.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

I claim:

1. A device for normally connecting the terminals of a storage battery in series in a charging circuit comprising a pair of connecters attached to leads in a series circuit for insertion in the terminals of a storage battery, and a metallic member having apertures for receiving the connecters to electrically connect the same when not inserted in the terminals of the storage battery.

2. A device for normally connecting the terminals of a storage battery in series in a charging circuit comprising a pair of connecters for insertion in the terminals of a storage battery, connected to leads in the series circuit and a metallic member for receiving the connecters for electrically connecting the same when not inserted in the terminals of the storage battery.

3. A device for normally connecting the terminals of a storage battery in series in a charging circuit comprising a pair of connecters attached to leads in the series circuit for insertion in the terminals of a storage battery, and a metallic member mounted on insulating material, having apertures therein for receiving the connecters to electrically connect the same when not inserted in terminals.

4. A device for connecting the terminals of a storage battery in a charging circuit comprising leads associated with separate conductors, connecters on the ends of the leads for engaging the opposite terminals of a storage battery and a conductive element in which the connecters may be inserted to electrically connect the conductors but to hold them out of physical contact when not connected to terminals.

5. A device for connecting the terminals of a storage battery in a charging circuit comprising an insulating mounting, leads arranged in pairs mounted thereupon, connecters on the ends of the leads for engaging the opposite terminals of the storage battery, and a conductor mounted on the said insulating material for receiving the connecters when not connected to terminals.

6. A device for connecting the terminals of a storage battery in a charging circuit comprising an insulating mounting, leads arranged in pairs mounted thereupon, connecters on the ends of the leads for engaging the opposite terminals of a storage battery, and a conductor mounted on the said insulating mounting provided with apertures to receive the connecters when not connected to terminals.

7. A device for connecting the terminals of a storage battery in a charging circuit comprising a piece of insulating material having a pair of leads each lead being separately connected thereto, connecters for engaging the opposite terminals of a storage batery fixed on the leads, and a conductor mounted on the insulator piece for receiving the connecters when not connected to terminals.

8. A device for connecting the terminals of a storage battery in a charging circuit comprising a piece of insulator material having a pair of leads each lead being separately connected thereto, connecters for engaging the opposite terminals of a storage battery fixed on the leads, and a conductor mounted on the insulator piece having apertures for receiving the connecters when not connected to terminals.

9. A device for connecting the terminals of a storage battery in a charging circuit comprising a piece of insulator material having a pair of leads each lead being separately connected thereto, connecters having tapered body portions terminating in points for fitting in the opposite terminals of a storage battery, and a conductor mounted on the insulator piece having tapered apertures for receiving the body portions of the connecters when not connected to terminals.

10. An apparatus for connecting a plurality of storage batteries in series for charging comprising means for mounting a plurality of units each having an individual pair of leads connected in a charging circuit and an insulated conductive element, and means to selectively connect the leads to the opposite terminals of the storage battery, or to electrically connect the leads out of physical contact with each other through the insulated conductive element forming a part of each unit.

11. An apparatus for connecting a plurality of storage batteries for charging comprising a panel formed of connected bottom, back, front and end portions, the back portion being adapted to be mounted on a charging rack, a plurality of units corresponding to the number of batteries accommodated under charge, mounted on the front portion of the panel, each unit having an individual pair of leads carrying connecters for connection to the opposite terminals of each battery, the leads being connected in series with a charging circuit and insulated conductive elements mounted on each unit having apertures for receiving and electrically connecting the connecters out of physical contact when not connected to battery terminals.

12. An apparatus for connecting a plurality of storage batteries for charging comprising a panel formed of connected side and bottom portions, triangular in cross section, and having end portions, a plurality of units corresponding to the number of batteries accommodated under charge mounted on each of the side portions, the units having individual pairs of leads connected in series in a charging circuit and provided with connecters for connection to the opposite terminals of each battery, and insulated conductive elements mounted on each unit having apertures for receiving and electrically connecting the connecters out of physical contact when not connected to battery terminals.

13. An apparatus for connecting a plurality of storage batteries for charging comprising a panel formed of top, bottom and side portions closed at the ends for mounting against a wall on a charging rack, a plurality of units corresponding to the number of batteries accommodated under charge mounted on the side portion, individual pairs of leads connected in series in the charging circuit carrying connecters for connection to the opposite terminal of each battery, and insulated conductive elements mounted on each unit having apertures for receiving and electrically connecting the connecters out of physical contact when not connected to battery terminals.

14. A device for connecting the terminals of a storage battery in a charging circuit, comprising an insulating mounting, leads arranged in pairs mounted thereupon, connecters having tapered body portions on the ends of the leads for engaging the opposite terminals of a storage battery, and a conductor mounted on the said insulating mounting having tapered apertures for receiving the tapered body portions of the connecters.

15. A device for connecting the terminals of a storage battery in a charging circuit, comprising an insulating mounting, leads arranged in pairs mounted thereupon, connecters having tapered body portions on the ends of the leads for engaging the opposite terminals of a storage battery, and a conductor mounted on the said insulating mounting having tapered apertures for receiving the tapered body portions of the connecters when they are not connected to the battery terminals.

BENJAMIN F. W. HEYER.